United States Patent [19]

Käuffer

[11] Patent Number: 4,717,484
[45] Date of Patent: Jan. 5, 1988

[54] PROCESS FOR COMPLETING CIRCULATORY SYSTEMS USED TO PURIFY WATER AND SEWAGE

[76] Inventor: Karl C. Käuffer, Provinostrasse 52, D-8900 Augsburg, Fed. Rep. of Germany

[21] Appl. No.: 836,363

[22] Filed: Mar. 5, 1986

[30] Foreign Application Priority Data

Mar. 6, 1985 [DE] Fed. Rep. of Germany ....... 3507839
Dec. 23, 1985 [DE] Fed. Rep. of Germany ....... 3545839

[51] Int. Cl.⁴ .............................. C02F 1/52; C02F 1/20
[52] U.S. Cl. ......................................... 210/711; 55/55; 55/68; 55/73; 210/705; 210/712; 210/718; 210/724; 210/748; 210/772; 210/906; 210/912; 423/235

[58] Field of Search ............... 55/55, 68, 73; 210/609, 210/710, 711–713, 718, 750, 903, 906, 912, 772, 705, 724, 748; 423/235

[56] References Cited

U.S. PATENT DOCUMENTS

| | | | |
|---|---|---|---|
| 2,196,840 | 4/1940 | Singleton | 210/711 |
| 3,385,785 | 5/1968 | Forrest et al. | 210/906 |
| 3,725,266 | 4/1973 | Haviland | 210/710 |
| 3,828,525 | 8/1974 | Copa et al. | 55/74 |
| 4,140,651 | 2/1979 | Burnell et al. | 423/235 |
| 4,343,706 | 8/1982 | Etzel et al. | 210/711 |
| 4,350,597 | 9/1982 | Selm et al. | 210/710 |
| 4,566,975 | 1/1986 | Allgulin | 210/906 |

FOREIGN PATENT DOCUMENTS 0064279 12/1985 European Pat. Off. .

OTHER PUBLICATIONS

Mellor, *Inorganic & Theoretical Chemistry*, vol. X, 1947, p. 173.
Pp. 4 and 5 of English translation of German Priority Appln. P 35 07 839.1.

*Primary Examiner*—Peter Hruskoci
*Attorney, Agent, or Firm*—Armstrong, Nikaido, Marmelstein & Kubovcik

[57] ABSTRACT

Water or sewage which contains sludges containing organic waste materials or waste materials which can be chemically precipitated are mixed with a flocculant consisting of a metal salt solution and are subsequently degasified. Thereafter, the pure water and organic sludge containing admixed metal hydroxide are separated from each other. The pH value of the sludge mixture is decreased until the metal hydroxides are dissolved as metal salts so that the organic sludge can be separated from the resulting metal salt solution. The metal salt solution is recirculated for re-use as a flocculant. Because the separated sludge still contains metal salts, it is treated with wash water and may possibly be further acidified. After the separation, the pH value of the wash water is increased to precipitate a metal hydroxide sludge, which is separated from the wash water and recycled to the degasified sewage.

15 Claims, 5 Drawing Figures

PROCESS FOR COMPLETING CIRCULATORY SYSTEMS USED TO PURIFY WATER AND SEWAGE

This invention relates to a process of completing circulatory systems for flocculant used with aqueous liquids and sewages which contain waste substances that can be eliminated by flocculation, such as are obtained in most industries and in municipalities.

It is known that metal hydroxide sludges are obtained in increasing quantities in the chemical and chemical-biological purification of municipal and industrial sewages and that said sludges give rise to increasing problems. If such sludges contain toxic metals, such as zinc or cadmium, a dumping of said sludges is permitted only on special dumps for hazardous wastes. The average costs of such dumping amounts to about $200 per metric ton at the present time. Other sludges, which do not contain such toxic constituents, should desirably be suitable for a combustion and/or pyrolysis of sludge and for that purpose their salt content should be minimized. Besides, the combustion or pyrolysis must not result in a formation of deleterious substances. In known processes of producing such sludges, iron hydrocarbonate is added to aqueous liquors and sewages which are contaminated. That addition results in a flocculation of the sludges so that the pure water can be separated. In the conventional processes the flocculants which have been used are lost with the sludge and the quantity of sludge is increased by the flocculants which have been added. As the requirements for protection of the environment are continually made more stringent, it is desired in industry to use aqueous industrial wastes in a closed circulatory system as far as possible so that the wastes can be re-used for production when they have been purified.

In view of that background it is an object of the invention to provide a process which is of the kind described first hereinbefore and which results in an end product consisting of an organic sludge which is almost entirely free of metal salt and is excellently suitable for combustion or pyrolysis. Besides, the process should permit an economical use of new technologies and should permit the substances employed to be recovered to the highest possible degree.

In the process of the kind described mentioned first hereinbefore that object is accomplished in accordance with the invention by the combination of the following process steps:

(a) Mixing the sewage or sewage sludge a flocculant consisting of metal salt solution (b) degasifying the sewage or sewage sludge and collecting the resulting gas if the process is carried out with $CO_2$;

(c) separating the pure water from the flocculated mixture of metal hydroxide and organic sludge;

(d) decreasing the pH value of the mixture until metal salts are dissolved, recycling the resulting metal salt solution as flocculant to the process step (a), and transferring the remaining sludge to a washing vessel;

(e) washing the remaining sludge with wash water;

(f) separating the remaining sludge from the wash water;

(g) increasing the pH value of the wash water until the metal salts dissolved in the wash water are precipitated as metal hydroxide sludge; and (h) admixing the metal hydroxide sludge to the sewage-flocculant mixture between process steps (b) and (c).

By the invention, the object set forth is completely accomplished and considerable advantages are afforded.

In the first place, an almost complete system for circulating flocculant is obtained because even residual metal hydroxides which have not been dissolved are recovered from the wash water.

In that respect the invention is based on the recognition that the performance of known sewage-treating processes can greatly be improved by a reactivation of the flocculant and that the quantities of sludge which is finally obtained in an almost salt-free form can be decreased to 40 to 20% if that reactivation is adopted. A prejudice was held by the persons skilled in the art, who believed that an addition of acid would result in a dissolving also of the organic materials so that they would continually be recycled and the performance would thus be decreased. In practical trials it has been found that contrary to that prejudice a surprising result is produced, which resides in that the acidification does not cause organic matter to enter the outer circulatory system and that on the contrary, the performance is improved. It is believed that the organic matter entrained by the circulating flocculant becomes effective as nuclei for the flocculation.

In the process in accordance with the invention, up to 85% of the flocculant is recycled. Because the flocculant will be available in dissolved form when it is recycled after having performed its function, additional objects can be accomplished in an economical manner. This includes, e.g., the selective removal of heavy metal ions from the circulatory system, as will be explained more in detail hereinafter. In that manner a formation of sludges which would constitute hazardous wastes can be avoided so that additional costs for the dumping of the sludge can be saved because said sludges can be dumped on normal dumps or burnt or pyrolyzed. Besides, the sludge is formed in much smaller quantities.

Owing to that peculiarity, a third purification stage may be introduced into clarification technology. That third stage may be used, e.g., for an economical removal of phosphates by precipitation. Another important field of application of the present invention is the conversion of existing overloaded clarifying plants with the result that the quantities of sludge can be reduced by up to 80% so that digesting towers and similar equipment are relieved, the limits prescribed for ecological reasons can more easily complied with, and dumping costs can be saved in that case too.

Because the flocculant is dissolved, sulfur can also be recovered.

Additional desirable embodiments of the inventions are recited in the dependent claims. In a particularly preferred embodiment the pH value is decreased by means of the products obtained by a scrubbing of a flue gas, for instance, of the flue gas formed by a combustion or pyrolysis of the sludge. In that case the acidification costs can also be decreased and $CO_2$ can be recycled. Because flue gases are preferably scrubbed in any case, the flue gas can also be denitrified.

Additional desirable details and further features of the invention are apparent from the dependent and additional independent claims and from the following description, in which the invention will be explained in more detail with reference to illustrative embodiments shown on the drawings, in which FIG. 1 is a block diagram illustrating a first embodiment of the process in accordance with the invention;

Figure 1:
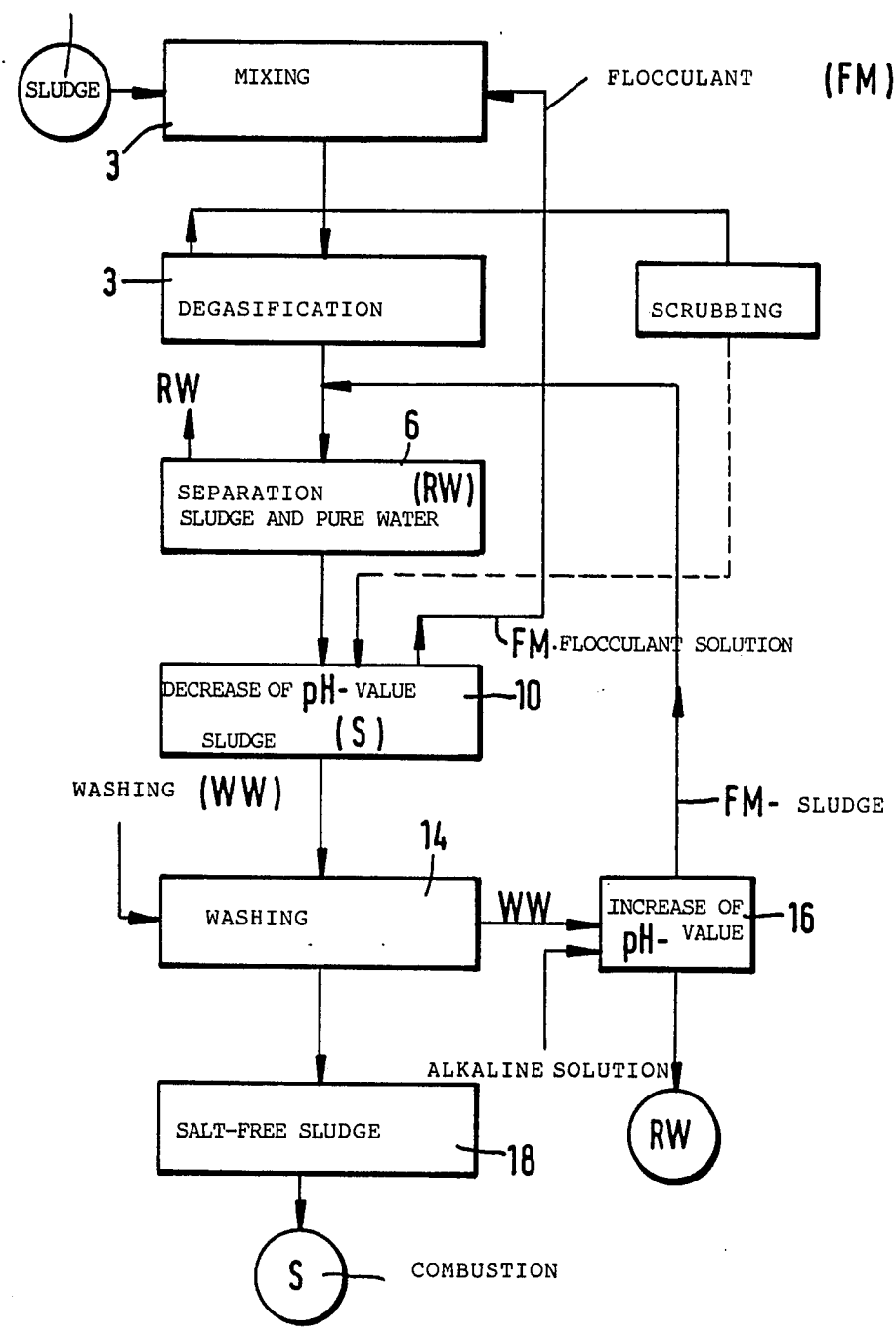

In the embodiment shown in FIG. 1, sewage sludge or sewage is first mixed with a flocculant, which consists of a metal salt solution. The resulting mixture is supplied to a flocculator and is degasified therein. The degasification may be effected by means of a vacuum of by stripping. The gas is collected for further use.

The sludge and the pure water (RW) are subsequently separated from each other, and the pure water is withdrawn. In that stage the sludge consists of the organic constituents and the flocculated metal hydroxides. In the next stage, the pH value of that mixture is decreased until the metal hydroxides are dissolved as metal salts. The resulting metal salt solution is recycled from that stage as a flocculant (FM) to the mixing stage. As a result, the flocculant is continually circulated in a system comprising mixing, degasifying, separating and decreasing the pH value and is continually dissolved by acidification. This may be effected by any desired acid although carbonic acid of sulfuric acid is preferred, for reasons which will be set forth hereinafter. For instance, as indicated in FIG. 1, this can be accomplished in that the gas recovered in the degasifying stage is scrubbed so that $CO_2$ can be used to assist the decrease of the pH value of the sludge. It will be understood that different acids may be supplied in that stage.

When the flocculant has been dissolved as a result of the acidification, the sludge consisting substantially of organic constituents is transferred to the washing stage and is treated there with wash water. During the washing operation, the remaining metal salts are taken up by the wash water so that a sludge which is free of salt can be withdrawn from the washing stage. Such a salt-free sludge can readily be dumped or can be burnt by pyrolysis, as indicated.

The wash water is separated in the wash stage and in another stage is treated with an alkaline solution so that the pH value is sufficiently increased to cause the metal salts dissolved in the wash water to precipitate as a metal hydroxide sludge. The metal hydroxide is separated in that stage from the pure water and is returned to the circulatory system between the degasification and the separation of sludge and pure water. In that procedure the flocculant is almost completely recovered because the remaining flocculant recovered from the wash water is returned to the flocculant which is circulated as described hereinbefore.

In order to properly and sufficiently decrease the pH value, all embodiments of the process may include additional measures for a supply of additional acid. It will be preferable, however, to recover the acid ions from the process itself so that the circulation of flocculant is supplemented by a circulation of acid.

Figure 2:
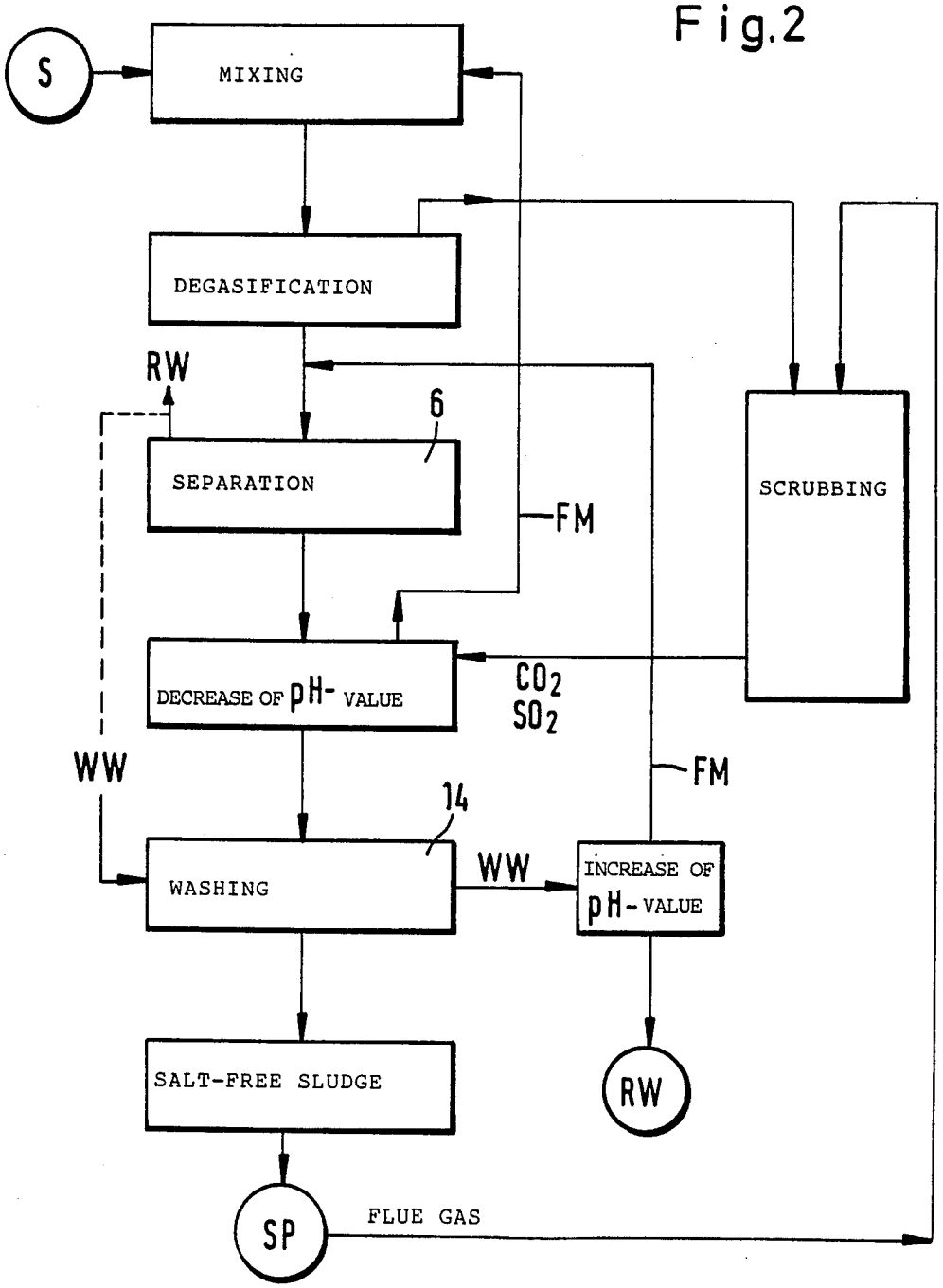
FIG. 2 shows the embodiment of FIG. 1 in conjunction with a scrubbing of the flue gas.

Such an embodiment of the process is illustrated by the block diagram of FIG. 2. As is shown, the acid ions required to acidify the mixed sludge consisting of sludge constituents and metal hydroxides are recovered by a scrubbing of a flue gas. That flue gas may consist of any desired flue gas or, in a closed system, of the flue gas formed by the combustion of the sludge (SP).

It is shown that the flue gas and the gas recovered in the degasifying stage are jointly treated in a scrubbing stage, in which $CO_2$ and $SO_2$ are removed, which are used to decrease the pH value.

The entire acid required in the process can be obtained virtually without additional costs in that flue gas is scrubbed to recover $CO_2$ and $SO_2$.

Because the process in accordance with the invention includes a scrubbing of gas in any case and the flocculant is recycled in a dissolved state, the flue gas can also be denitrified without difficulty and for this purpose may be scrubbed with dithionite, which is also recirculated. Under different circumstances the flue gas could not be economically denitrified.

Figure 3:
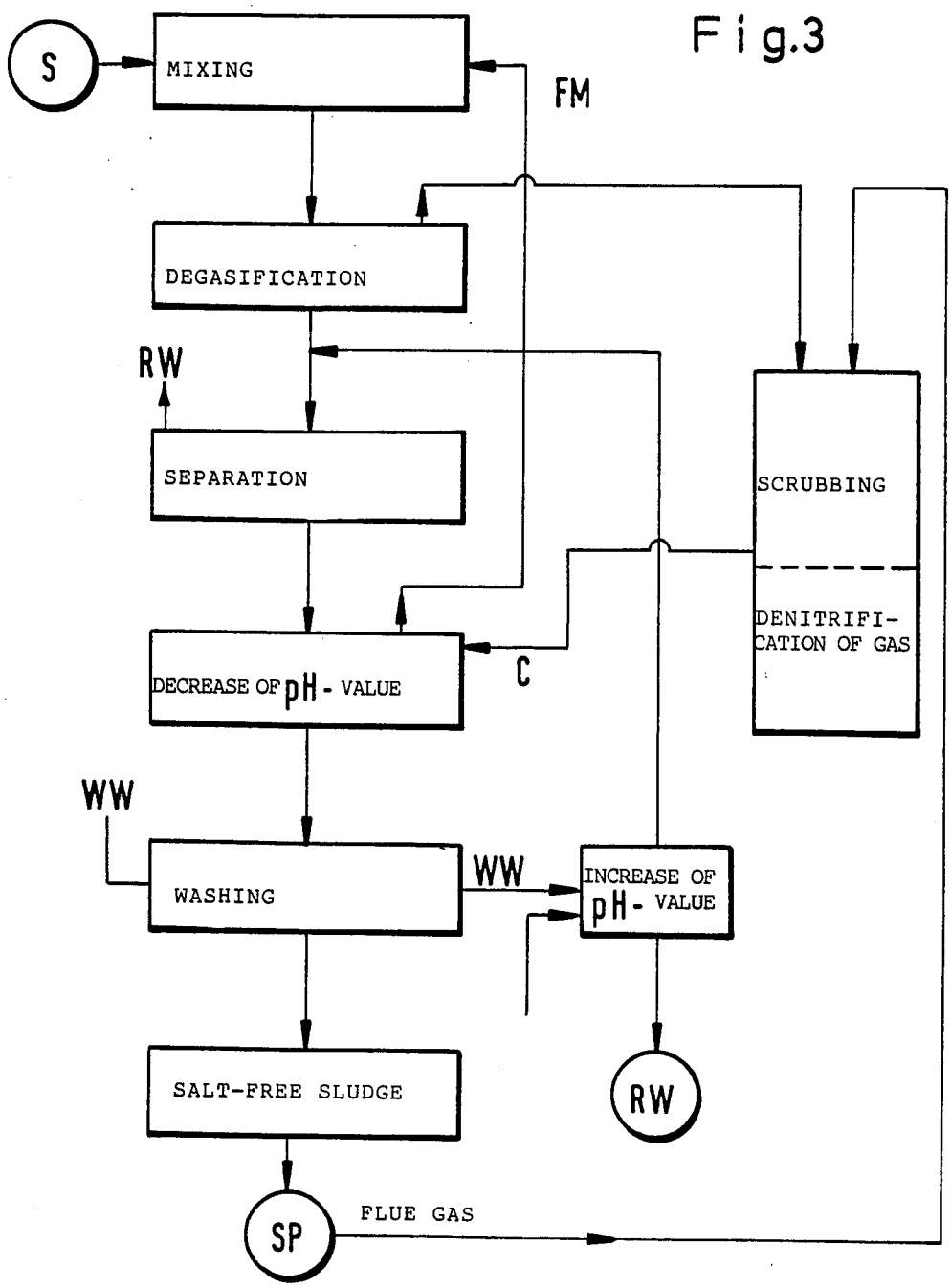
FIG. 3 shows the embodiment of FIG. 2 with a denitrification of the flue gas.

That embodiment of the process is illustrated by the block diagram of FIG. 3.

It has been stated hereinbefore that the acidified flocculant is recycled in a dissolved state to the beginning of the process. For this reason the invention permits toxic heavy metal ions to be separated without difficulty so that a sludge which would constitute a hazardous waste will not be obtained.

Figure 4:
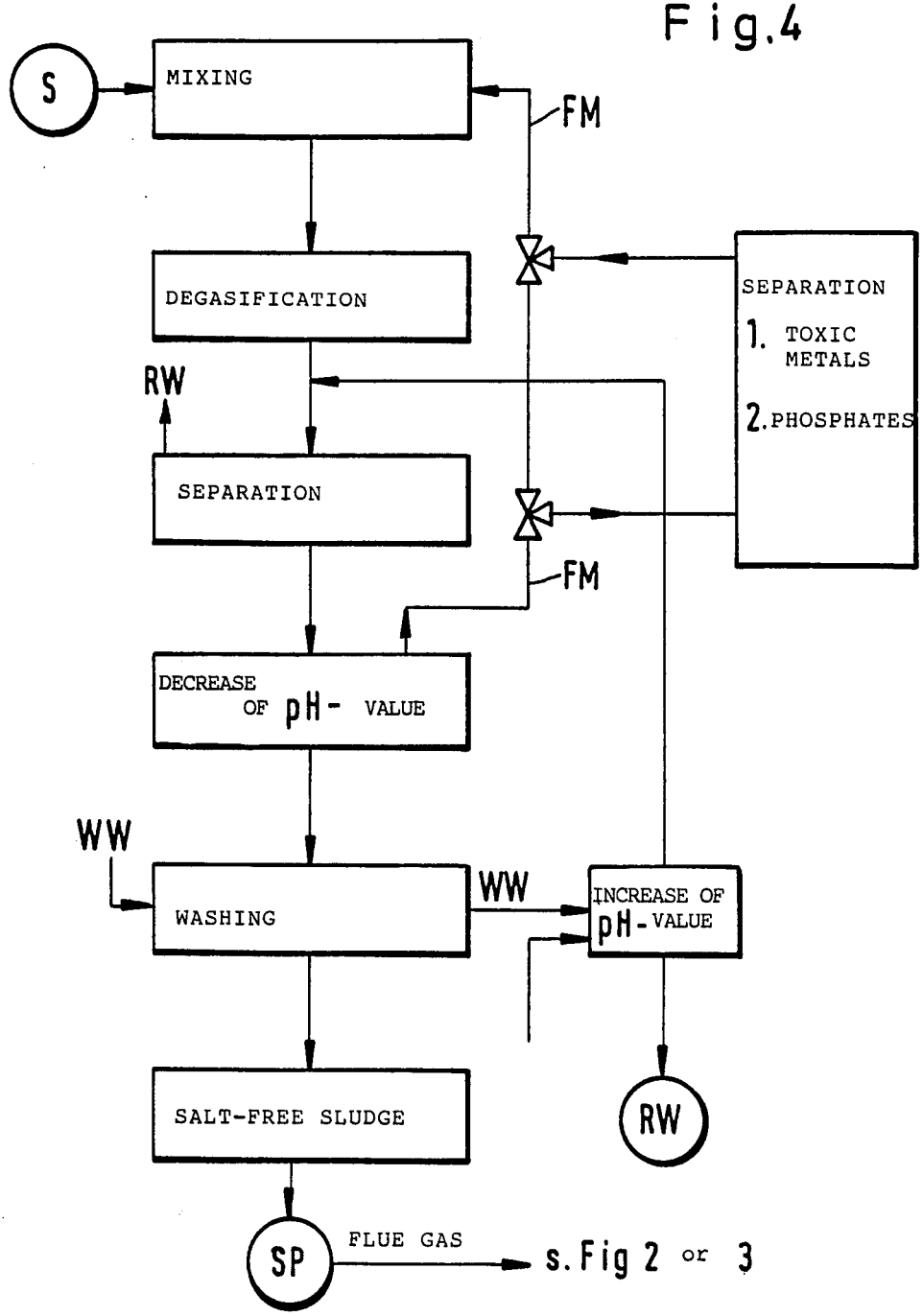
FIG. 4 is a block diagram which illustrates another embodiment of the process in accordance with the invention, in which toxic metals and phosphates are separated.

That embodiment of the process is illustrated in the block diagram of FIG. 4. In that embodiment, the scrubbing of the flue gas as shown in FIG. 2 or 3 may also be effected.

It is apparent that in that case the circulation of the flocculant may be modified in that a solution of the flocculant is branched off and used to separate toxic metals and to precipitate phosphates.

Toxic metals may be separated electrolytically or by chemical precipitation. If the flocculant consists of aluminum salts or iron salts, the heavy metal ions may be separated in that the aluminum salts or iron salts are flocculated and after their separation may be redissolved whereas the heavy metal ions remain in the original solution. In that case the redissolved salts are recycled as flocculant to the beginning of the process.

It will be understood that the above-mentioned embodiments permit an economical application of process technologies which would not be economical in themselves. With the exception of the salt-free sludge, which constitutes the product of the process, the essential components are recirculated and the efficiency of the process is substantially increased by that recirculation.

Figure 5:
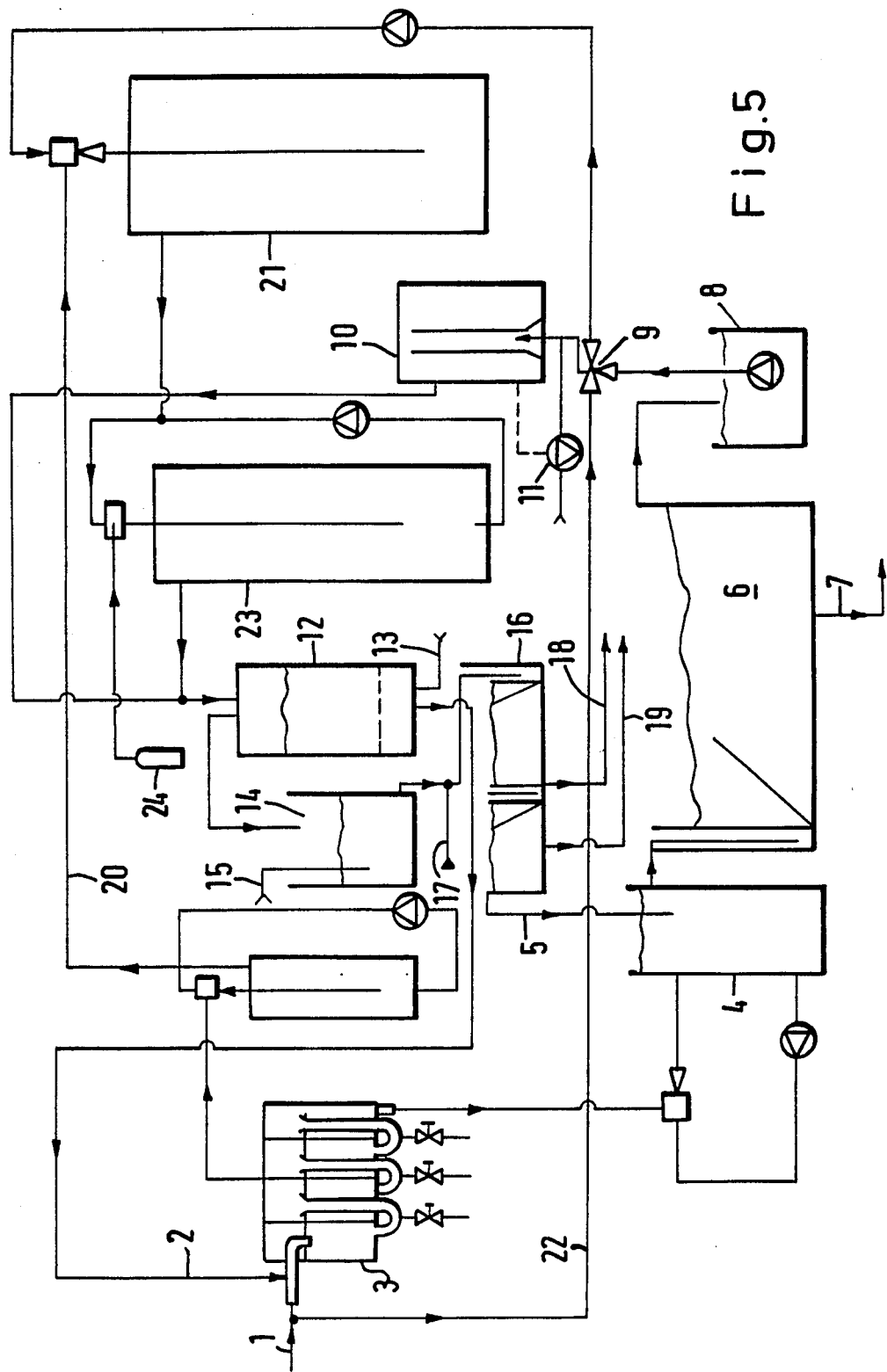
FIG. 5 is a diagrammatic showing of an apparatus for carrying out the process in accordance with the invention.

A plant for carrying out the process in accordance with the invention is diagrammatically shown in FIG. 5.

Two lines 1 and 2 constitute a mixer for mixing the sewage or sludge which is supplied in line 1, and the flocculant, which is supplied in line 2 and consists of a metal salt solution.

The sewage or sludge which contains organic substances is supplied through line 1 and the metal salt solution supplied in line 2 is admixed. The resulting mixture is supplied to a flocculator 3, in which the mixture is degasified. The degasification is preferably effected in that a vacuum is generated or by stripping. The mixture consisting of the resulting metal hydroxides and the organic sludge is transferred from the flocculator 3 to a reservoir 4, which is provided with a supply line 5 for supplying metal hydroxide sludge from the wash water separator.

In the reservoir, the metal hydroxide sludge is agitated and is thus mixed with the sludge mixture.

In a flotation apparatus 6, which is connected to the reservoir 4, the pure water is separated from the sludge mixture. The pure water is withdrawn from the apparatus 6 through a line 7 and can then be used. The remaining sludge mixture is transferred to a vessel 8 and can be pumped from that vessel through a three-way plug valve 9 to a reactor 10.

In the reactor 10, acid supplied in proper proportion by a pump 11 is added to the sludge mixture so that its pH value is decreased.

The resulting suspension is supplied to a filter vessel 12, in which the organic sludge is separated from the metal salt solution which has been formed by the acidification. The metal salt solution is recycled through line 2 to the mixing stage to serve as a flocculant.

The remaining sludge now consists mainly of organic constituents and is flushed out of the filter vessel 12 by means of flushing water supplied by line 13 and is transferred by said flushing water to a washing vessel 14.

In the washing vessel 14, the sludge is washed with wash water supplied through line 15. The wash water and sludge then enter a flotation cascade 16, in which additional acid supplied through line 17 may be admixed in order to ensure that all metal salts will be dissolved. The line 17 is connected to the line by which the washing vessel 14 is connected to the flotation cascade 16.

The sludge has now been completely purified and is withdrawn through line 18. That sludge may be thickened and dried and may subsequently be burnt in the pyrolysis stage. That sludge is in an optimum salt-free condition.

In the last stage of the flotation cascade 16 the pH value of the wash water is increased, preferably by an addition of lime, to precipitate a metal hydroxide sludge, which is supplied to the reservoir through the above-mentioned line 5.

The salt-free wash water left after that precipitation is withdrawn in line 19.

The flotation apparatus 6 may be replaced by a settling apparatus, which may consist of a simple basin or of a baffle plate thickener. In the processing of amphoteric metals, such as aluminum, the acidification in the reactor 10 may be replaced by a dissolving of the flocculant by an alkaline solution, which in that case is supplied by the proportioning pump 11.

The reactor 10 consists of a stirred vessel or preferably of a loop-type reactor. The flotation cascade consists preferably of two electric flotation units.

The gas which has been withdrawn from the flocculator 3 is supplied in line 20 to a reactor 21, which constitutes a scrubber, in which the gas is scrubbed to remove its $CO_2$ and/or $SO_2$ content. In the process embodiments described hereinbefore, that reactor is designed to permit also a denitrification and/or a scrubbing of flue gas in order to remove its $CO_2$ and $SO_2$ contents. The scrubber used as a reactor 21 may consist of a bubble column, a jet scrubber, a spray tower, a scrubbing column or a venturi scrubber.

Scrubbing is effected either by means of the sewage, which can be withdrawn from line 1 through line 22, or by means of the sludge mixture formed in the vessel 8.

The sewage or the sludge mixture is supplied to the reactor 21 through the three-way plug valve 9. The aqueous mixture which is formed in the reactor 21 and contains $CO_2$ and/or $SO_2$ is supplied to another reactor 23, in which $CO_2$ is added for the reaction.

The reactor 23 is preferably designed for a submerged reaction and may be supplied from a storage tank 24 with additional $CO_2$ to replace the carbonic acid which has been lost in the process.

The mixture which leaves the reactor 23 and which contains salts which have been derived from $CO_2$ and/or $SO_2$ is admixed to the suspension which comes from the reactor 10 and which is subsequently supplied to the filter vessel 12.

It has been mentioned hereinbefore that the carbonic acid and/or sulfurous acid which is employed is preferably recovered from a flue gas which contains the anhydrides of said acids in gaseous form.

The flocculants consist preferably of metal salts in the form of divalent iron salts.

The filter vessel 12 and the flocculator 3 may be preceded by a preliminary separator consisting, e.g., of a baffle plate thickener or a centrifuge.

All features and advantages of the invention which are apparent from the description, the claims, and the drawings, inclusive of structural details and spatial arrangements, may be essential for the invention in themselves and in any desired combination.

What is claimed is:

1. A process of completing circulatory systems in the purification of sewage and sewage sludge which contains chemically precipitable and organic wastes, comprising the following process steps:
    (a) mixing the sewage or sewage sludge with an effective amount of a flocculant consisting of a metal salt solution to form a flocculated mixture consisting of metal hydroxides and organic sludge;
    (b) degasifying the sewage-flocculant mixture to remove dissolved $CO_2$ and collecting the evolved gas;
    (c) separating pure water from the flocculated mixture;
    (d) decreasing the pH value of the mixture with a supply of $CO_2$ until metal hydroxides are dissolved to form a metal salt solution, which is recycled as a flocculant to process step (a), and transferring the sludge, which substantially consists of organic components, to a washer;
    (e) washing the sludge with wash water to remove residual metal salts from said sludge;
    (f) separating the washed sludge and the wash water;
    (g) increasing the pH value of the wash water until the residual metal salts dissolved in the wash water are precipitated to form a metal hydroxide sludge, and
    (h) admixing the metal hydroxide sludge with the sewage-flocculant mixture between process steps (b) and (c) to aid in separation of pure water from the mixture.

2. A process according to claim 1, in which the flocculated mixture obtained in process step (c) is used to scrub the gas collected in process step (b) in order to remove $CO_2$, which is supplied to the mixture after process step (c).

3. A process according to claim 2, in which fresh flue gas is also scrubbed by said flocculated mixture, and $SO_2$ is additionally removed by the scrubbing step.

4. A process according to claim 2, in which $CO_2$ and/or $SO_2$ are removed by scrubbing the gas in a plurality of stages.

5. A process according to claim 1, in which acid is added to said sludge before the wash water is separated.

6. A process according to claim 1 in which the pH value is increased by an addition of lime or milk of lime in process step (g).

7. A process according to claim 1 or 2, in which alkaline solution is supplied to the mixture to increase the pH value in process step (g).

8. A process according to claim 1 or 2, in which the pH value of the mixture is decreased in process step (d) by a supply of the products of a flue gas desulfurizer.

9. A process according to claim 8, in which the flue gas is denitrified.

10. A process according to claim 9, in which the flue gas is scrubbed with a dithionite solution, which is recycled after the nitrogen compounds have been separated.

11. A process according to claim 8, in which a flue gas is used which has been obtained by a combustion or pyrolysis of the washed sludge.

12. A process according to claim 1, in which the supply of $CO_2$ is recovered from flue gas.

13. A process according to claim 1, in which toxic heavy metal ions are separated from the phase which contains the recycled flocculant in solution.

14. A process according to claim 13, in which the separation is effected electrolytically and/or by selective precipitation.

15. A process according to claim 1, in which phosphates are precipitated from the phase which contains the recycled flocculant in solution.

* * * * *